Patented Mar. 25, 1924.

1,488,294

UNITED STATES PATENT OFFICE.

VIRGIL B. SEASE, OF PARLIN, NEW JERSEY, ASSIGNOR TO E. I. DU PONT DE NEMOURS & COMPANY, OF WILMINGTON, DELAWARE, A CORPORATION OF DELAWARE.

CELLULOSE-ACETATE FILM.

No Drawing. Application filed February 3, 1921. Serial No. 442,274.

*To all whom it may concern:*

Be it known that I, VIRGIL B. SEASE, a citizen of the United States, and a resident of Parlin, in the county of Middlesex and State of New Jersey, have invented a certain new and useful Cellulose-Acetate Film, of which the following is a specification.

This invention relates to cellulose acetate films which are suitable for use in photography, and especially in cinematography, and comprises a film containing cellulose acetate in combination with a triaryl phosphate and with a softener consisting mainly of triacetin (glyceryl triacetate).

I have found that a cellulose acetate film having the required degrees of durability, tensile strength, and flexibility to render it suitable for photographic purposes may be obtained by using triacetin in conjunction with triphenyl, or tricresyl, phosphate as the modifier for the cellulose acetate. The triacetin is preferably used in combination with a more active solvent for the cellulose acetate, such as mannol, ethyl phthalate, and particularly diacetin.

It has heretofore been proposed to manufacture celluloid articles having a cellulose acetate base by employing a variety of cellulose acetate whose solutions exhibit exceptionally high viscosities, and incorporating therein large proportions of softeners, such as triacetin, the resulting mixture being rendered non-inflammable by the addition of triphenyl phosphate. According to said proposed method there is used a cellulose acetate whose viscosity value is such as to permit of the incorporation of 50% or more of triacetin based on the weight of cellulose acetate present.

My investigation of photographic films has shown that, irrespective of the viscosity value of the cellulose acetate, the incorporation of a softener diminishes the tensile strength of the resulting film. Experiments which I have made indicate that the total amount of modifier (that is, triphenyl phosphate plus softener) should ordinarily not exceed 27% of the cellulose acetate. The proportion of softener should preferably be between 5 and 15%, and of triaryl phosphate, between 9 and 12% based on the weight of the dry cellulose acetate.

The triaryl phosphate should be material of a high degree of purity. The cellulose acetate should be a well hydrated variety, soluble in hot benzene-ethyl alcohol mixture and in hot aqueous ethyl alcohol. Pure triacetin may be used as the softener, but I have found that better results are obtained by using triacetin in conjunction with a more active solvent for the cellulose acetate; thus a desirable softener contains, for example, from 75 to 95% of triacetin and from 25 to 5% of diacetin; or in place of diacetin some other active solvent, as distinguished from "latent solvent," of cellulose acetate may be used. Specially good results have been obtained in practice with an acetin substantially free from monoacetin and from free acetic acid and analyzing between 85 and 95% triacetin and between 15 and 5% diacetin.

In making cellulose acetate solutions from which the above described film may be obtained upon evaporation I preferably employ, as a solvent, a mixture of acetone, ethyl acetate, and an acetone-condensation product such as mesityl oxide or diacetone alcohol. A suitable solvent mixture may, for example, have the following composition: acetone—65 parts (by weight), ethyl acetate—25 parts, mesityl oxide—3 parts, and diacetone alcohol—7 parts.

The procedure for making the film is briefly as follows: The solvent mixture is first prepared and triacetin and triphenyl phosphate or other softener for cellulose acetate is dissolved therein, the proportions of these two substances being regulated according to the amount of cellulose acetate it is intended to dissolve. The resulting solution is then caused to flow onto a casting wheel, and the film thus formed subjected to the usual operations employed in the manufacture of photographic film.

A satisfactory solution for cinematographic film production may be made according to the following formula:

| | Parts by wt. |
|---|---|
| Solvent mixture | 78.4 |
| Triacetin | 1.8 |
| Triphenyl phosphate | 1.8 |
| Cellulose acetate | 18.0 |

With a solvent mixture of the above-described composition, the rate of evaporation of the solvent when the solution is flowed on the casting wheel is not so rapid as to cause the formation of a skin on the surface of the freshly poured film. Such a skin is objectionable for the reason that it buckles and gives a final film of non-uniform thickness.

I claim:—

1. A photographic film comprising cellulose acetate, from about 9 to 12% of a triaryl phosphate, and from about 5 to 15% of a mixture composed of from 5 to 15 parts of diacetin and from 95 to 85 parts of triacetin, the percentages being based on the weight of cellulose acetate.

2. A composition comprising a solution of cellulose acetate, triacetin, and a triaryl phosphate in a solvent comprising acetone, ethyl acetate and mesityl oxide.

3. A composition comprising a solution of cellulose acetate, triacetin, and a triaryl phosphate in a solvent comprising acetone, ethyl acetate, mesityl oxide, and diacetone alcohol.

4. A composition comprising a solution of cellulose acetate, triacetin, and triphenyl phosphate in a solvent comprising acetone, ethyl acetate and an acetone-condensation product.

In testimony whereof I affix my signature.

VIRGIL B. SEASE.